(12) United States Patent
Alvarado et al.

(10) Patent No.: US 8,094,802 B2
(45) Date of Patent: Jan. 10, 2012

(54) MULTIPLE QUEUING AND SERVICING OF A CONTACT

(75) Inventors: Joaquin Omar Alvarado, Eatontown, NJ (US); David Bauer, Cherry Hills Village, CO (US); Matthew O'Donnell, Furlong, PA (US)

(73) Assignee: Avaya Inc., Basking Ridge, NJ (US)

( * ) Notice: Subject to any disclaimer, the term of this patent is extended or adjusted under 35 U.S.C. 154(b) by 1197 days.

(21) Appl. No.: 11/831,549

(22) Filed: Jul. 31, 2007

(65) Prior Publication Data

US 2009/0034711 A1    Feb. 5, 2009

(51) Int. Cl.
*H04M 3/00*    (2006.01)
*H04M 5/00*    (2006.01)

(52) U.S. Cl. ......... 379/265.01; 379/266.03; 379/266.06; 379/309

(58) Field of Classification Search ............. 379/265.01, 379/266.03, 266.06, 309
See application file for complete search history.

(56) References Cited

U.S. PATENT DOCUMENTS

| 4,943,996 | A | * | 7/1990 | Baker et al. | 379/93.23 |
| 5,506,898 | A | * | 4/1996 | Costantini et al. | 379/266.06 |
| 6,434,230 | B1 | * | 8/2002 | Gabriel | 379/265.01 |
| 6,766,014 | B2 | | 7/2004 | Flockhart et al. | |
| 6,820,260 | B1 | | 11/2004 | Flockhart et al. | |
| 2007/0230684 | A1 | * | 10/2007 | Walker et al. | 379/266.01 |

OTHER PUBLICATIONS

Cisco, "Queue a Call to Multiple CSQs", Document ID: 63710, Oct. 20, 2006, 2 pp., Cisco Systems.

* cited by examiner

*Primary Examiner* — Quynh Nguyen

(57) ABSTRACT

A contact originator is given a choice to enqueue the contact in multiple contact queues, to serve multiple needs or interests of the originator. If the contact reaches the head of the queue for the primary need while the contact is being serviced from a queue for a secondary need, the contact either remains at the head of the primary-need queue until the servicing at the secondary-need queue is completed, or a resource of the primary-need queue is conferenced in with the contact and the resource of the secondary-need queue so that the resources can serve both needs simultaneously.

31 Claims, 4 Drawing Sheets

MULTIPLE QUEUING AND SERVICING OF A CONTACT

TECHNICAL FIELD

This invention relates generally to communications systems, and specifically to enqueuing of contacts in such systems.

BACKGROUND OF THE INVENTION

A customer may contact a contact center of a business for a particular purpose, but may have additional needs or interests that the contact center can also serve. It is desirable to discover those additional needs or interests and serve them during the time that the customer would normally spend waiting to have served their primary need, i.e., the need that caused the customer to contact the contact center in the first place.

The art already provides for interacting with a customer in various ways while the customer is waiting for a call center agent. For example, U.S. Pat. No. 6,820,260 discloses customizing an applet (an application program) for a waiting customer based on the customer's selection of an in-queue experience and other customer data, and executing the applet to interact with the waiting customer.

The art also provides for enqueuing of a customer (of the customer's call) in multiple queues. For example, U.S. Pat. No. 6,434,230 discloses using attributes of a call to find one or more resources that fit those attributes, and enqueuing the call in the queues of the one or more resources. The call is served by only one of the resources for which it has been queued.

Neither of these capabilities of the prior art necessarily serves the needs or interests of the customer that are additional to the customer's primary need.

SUMMARY OF THE INVENTION

This invention is directed to solving these and other problems and insufficiencies of the prior art. According to the invention, a contact is enqueued in a first contact queue, a determination is made of whether or not to enqueue the contact in at least one second contact queue, and in response to the determination, the contact is enqueued in the at least one second contact queue while the contact remains enqueued in the first contact queue. Illustratively, selection of the second contact queue from a plurality of possible contact queues and determining whether or not to enqueue the contact in the second contact queue is effected by interacting with an originator of the contact (the contactor), and then using the results of the interacting and also the in-queue estimated wait times of the first and the second contact queues, to make the selection and/or the determination. Illustratively, the determination is made while the contact is enqueued in the first contact queue. The enqueued contact is first serviced with a resource (e.g., an agent) of one of the first and the second contact queue while remaining enqueued in the other of the first and the second contact queue. The enqueued contact is secondly serviced with a resource of the other of the first and the second contact queue subsequently to commencing of the first servicing. The resource of the first contact queue serves a first, primary, need of the contactor and the resource of the second contact queue serves a secondary need of the contactor. Illustratively, the contact is first serviced by a resource of the second contact queue. If the contact advances to the head of the first contact queue while being first serviced by the resource of the second contact queue, either the contact remains in the first contact queue until the first servicing of the contact has been completed, or the first resource and the second resource are conferenced with the contact to simultaneously service the contact. Illustratively, if a contact that is enqueued in both contact queues is serviced by a resource of the first contact queue before being serviced by a resource of the second contact queue, a determination is made of whether or not to also service the contact with a resource of the second contact queue. The determination can illustratively be made by interacting with the originator of the contact to determine their choice prior to enqueuing the contact in a second contact queue. Alternatively, the first agent may query the contactor and ask if they wish to be served by the second contact queue. If the first agent has completed their work while the contactor remained enqueued in the second queue, the contactor can return to queue and wait. If the second agent becomes available while the first agent is serving the contactor, then either the agents can be conferenced or the second agent can be used to serve another party in the queue while retaining the contactor at the head of the second queue until such time as the work with the first agent is completed.

Advantages and capabilities that the invention may yield include using in-queue wait time to determine wait treatment (e.g., what choices to offer to the originator of the contact), using resource availability to determine in-queue wait treatment, using this information to enable the originator to choose to enqueue the contact in multiple queues, and automatically conferencing the resource of the first contact queue with the contact and the resource of the second contact queue when the contact reaches the head of the first contact queue. These capabilities make better use of contact center resources, they provide faster and better service to the contact initiator, and they potentially increase the likelihood of successful up-sell opportunities.

The invention may be implemented as a method, an apparatus for performing the method, or a computer-readable medium containing instructions which, when executed by a computer, cause the computer to perform the method.

BRIEF DESCRIPTION OF THE DRAWING

These and other features and advantages of the invention will become more apparent from considering the following description of an illustrative embodiment of the invention together with the drawing, in which.

DETAILED DESCRIPTION

Figure 1:
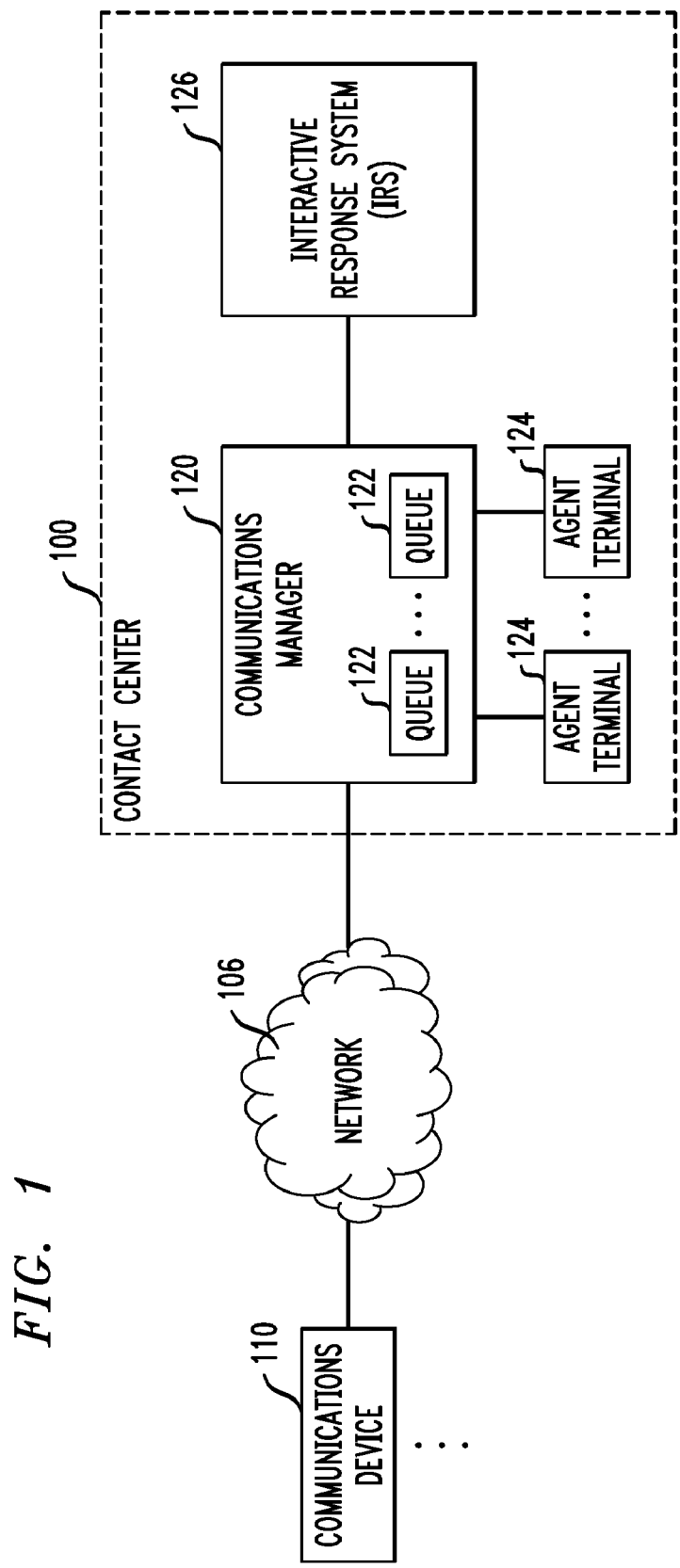
FIG. 1 is a block diagram of a communications system that includes an illustrative embodiment of the invention.

FIG. 1 shows a communications system that comprises one or more user communications devices 110 connected by a communications network 106 to a contact center 100. The system of FIG. 1 may take many forms. For example, the system may be a conventional telephone system where devices 110 are telephones, network 106 is the public switched telephone system, and contact center 100 is a call center. Or, the system may be a Voice over Internet Protocol (VoIP) system where devices 110 are VoIP terminals, network 106 is a wide area network such as the Internet, and contact center 100 is a VoIP contact center. Or, the system may be a data network where devices 110 are personal computers or personal digital assistants, network 106 is the Internet, and contact center 100 is a multimedia contact center that communicates with devices 110 via voice, email, instant messaging, text chat, video call, etc. These are just a few examples of the form that the system of FIG. 1 can take. Its form is irrelevant for purposes of this invention.

Contact center 100 comprises a plurality of agent terminals 124 or other contact-servicing resources, a communications manager 120 for distributing contacts for servicing among terminals 124, and an interactive response system (IRS) 126 for automatically interacting with users of devices 110. Manager 120 and IRS 126 illustratively are each a stored-program-controlled machine comprising a storage medium storing programs and a processor that executes the programs from the storage medium. Communications manager 120 implements a plurality of queues 122 for holding contacts while the contacts are waiting for resources, such as agents of terminals 124, to become available to service the contacts. Contacts normally move sequentially through a queue, from the end of the queue to the head of the queue. When a contact reaches the head of the queue, it is removed from the queue and assigned for servicing to the next available resource (e.g., an agent) that is associated with the queue. Illustratively, if the system of FIG. 1 is the telephone system, communications manage 120 comprises an automatic call distribution (ACD) private branch exchange (PBX), and interactive response system 126 comprises an interactive voice response (IVR) system. Or, if the system of FIG. 1 is a VoIP or other data communications system, communications manager 120 illustratively comprises the Avaya Communication Manager, and interactive response system 126 illustratively comprises the Avaya Voice Portal. The form that contact center 100 takes is substantially irrelevant for purposes of this invention.

Figure 2:
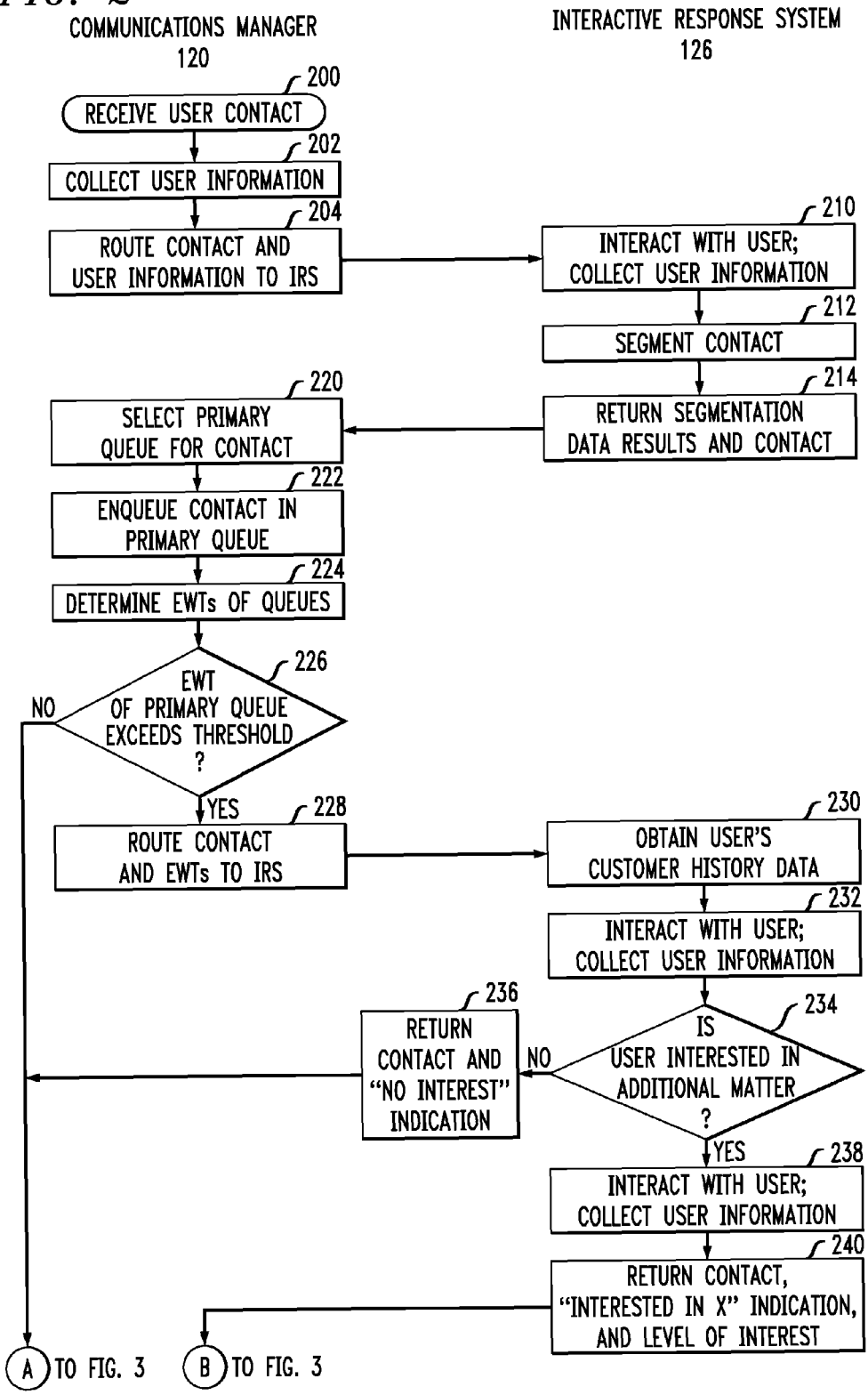
FIGS. 2-4 constitute a functional-flow diagram of operations of a contact center of the system of FIG. 1.
Figure 3:
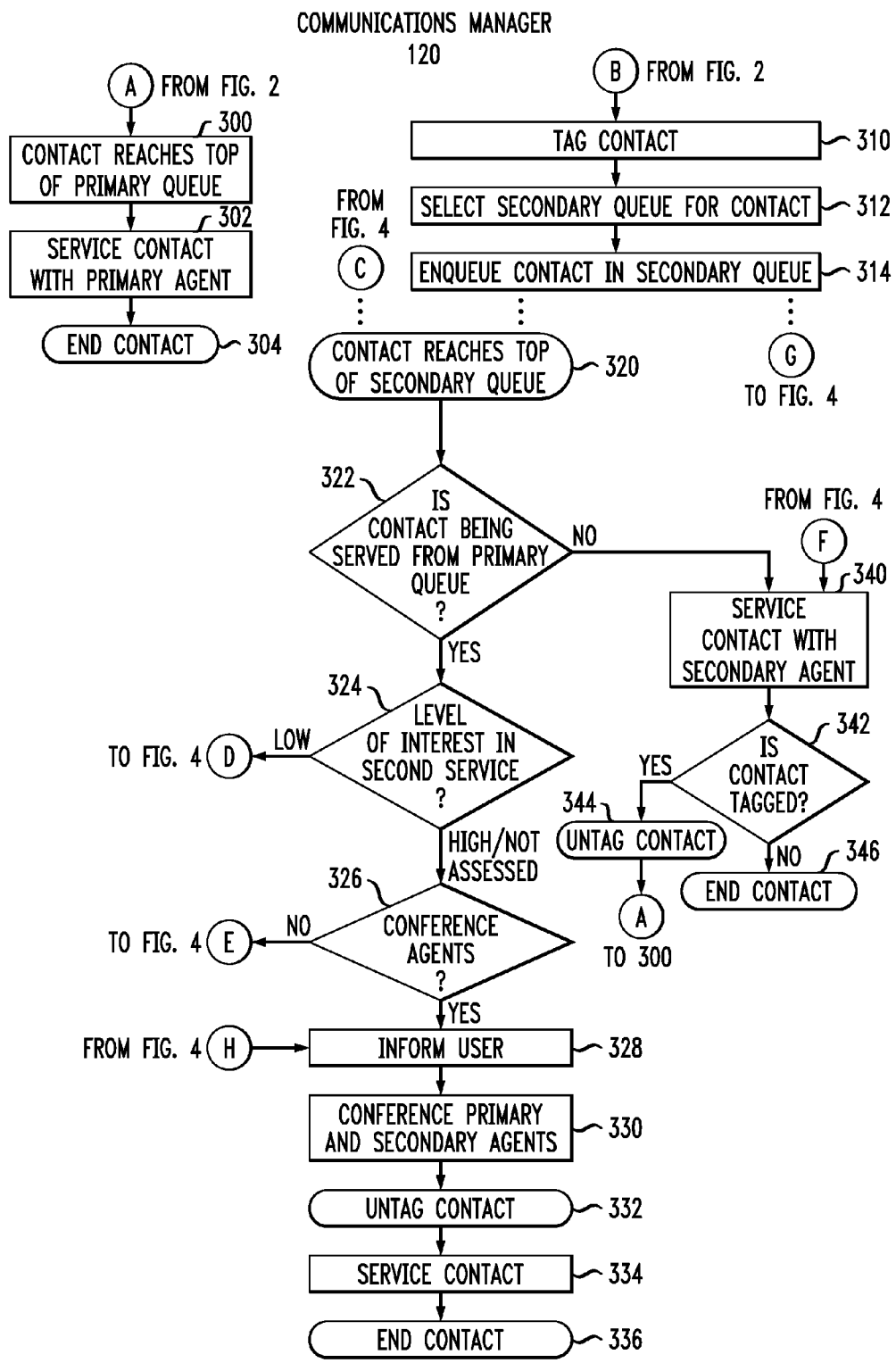
Figure 4:
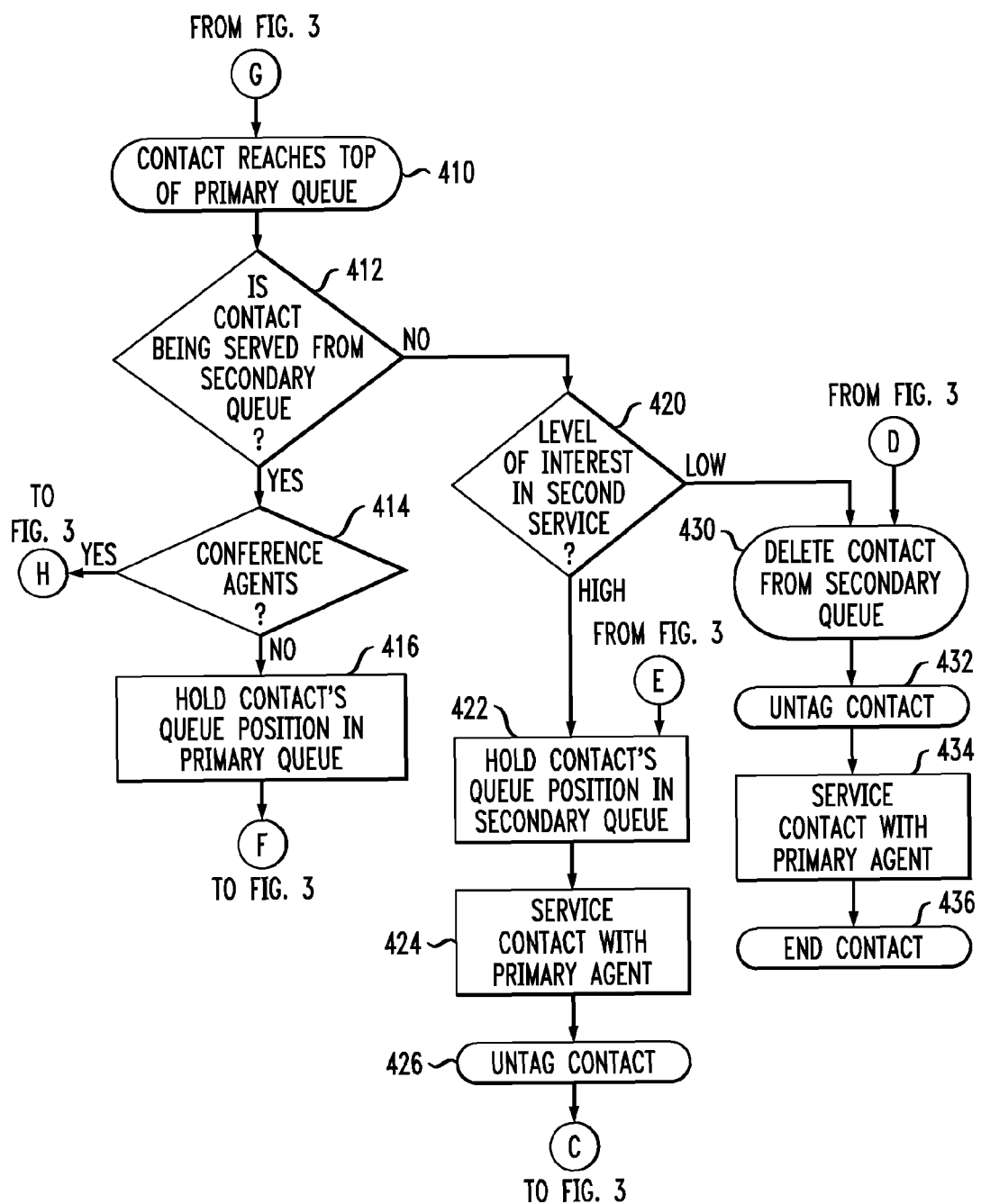

As described so far, the system of FIG. 1 is conventional. FIGS. 2-4 show functionality of contact center 120 that implements an illustrative embodiment of the invention.

When communications manager 120 receives a contact (e.g., a call or a message) from a user of a device 110, at step 200 of FIG. 2, it collects user information, such as the calling and called numbers, at step 202. Manager 120 then routes the contact to IRS 126 and sends the collected information to IRS 126 along with the contact, at step 204.

In response to receiving the contact and related information, IRS 126 interacts with the user of device 110 to obtain additional information, such as identity of the user, the purpose for the contact, any account information, etc., at step 210. IRS 126 uses the information obtained from manager 120 and from user of device 110 to segment the contact, at step 212. Segmentation refers to classifying a contact according to who is making the contact, what do they want, how valuable are they to contact center 100, etc. IRS 126 then returns the contact and the segmentation results to manager 120, at step 214.

In response to the segmentation, data manager 120 selects a primary queue 122 for the contact, at step 220, in a conventional manner. This queue is called the primary queue because it corresponds to the interest or need (determined at step 210) that caused the user to contact contact center 100. Manager 120 enqueues the contact in the primary queue 122, at step 222. Manager 120 then determines the in-queue estimated wait times (EWTs) for all queues 122, at step 224. EWT of a queue is a measure of how long the last contact entered into that queue is likely to remain enqueued therein, waiting for an agent to become available to service the contact. Manager 120 then checks whether the EWT of the primary queue 122 exceeds a threshold, at step 226. The threshold is some amount of time deemed by a manager of contact center 100 to be the minimum needed in order to serve another need or interest that the user of device 110 might have.

If the EWT of the primary queue 122 does not exceed a threshold, manager 120 proceeds to treat the contact conventionally, at steps 300-304 of FIG. 3: When the contact reaches the head (top) of the primary queue 122, at step 300, manager 120 connects the contact to terminal 124 of the next available agent for the primary queue 122, and the agent services the contact, at step 302. When the agent finishes servicing the contact, the contact is ended (e.g., the call is terminated), at step 304.

Returning to step 226 of FIG. 2, if the EWT of the primary queue 112 is found to exceed the threshold, manager 120 routes the contact and the EWTs of queues 122 back to IRS 126, at step 228.

In response to the contact and the EWTs, IRS 126 optionally obtains any customer history data that contact center 100 may have on the user, at step 230, and uses all of the information at its disposal to again interact with the user of device 110 to collect additional information regarding what other needs or interests the user may have and whether the user wants to address those needs or interests right now, at step 232. IRS 126 uses the historical data to try and anticipate what interests or needs the user may have. Alternatively, IRS 126 skips steps 230 and 232 and merely uses the provided EWTs of queues 122 to determine how long an interaction it may have with the user and what interests it may offer to serve. IRS 126 may offer to the user only matters of potential interest for which the EWTs of their contact queues 122 are significantly shorter than the EWT of the primary contact queue 122. IRS 126 then conducts a corresponding interaction with the user, at step 232. For example, the user may have contacted contact center 100 regarding MP3 players, but customer history data or the shortness of the contact queue may lead IRS 126 to query whether the user would also be interested in High-definition televisions (HDTVs). IRS 126 may repeat the query for additional maters of potential interest to the customer.

Based on the results of the interaction, IRS 126 determines whether or not the user is interested in additional matter, and if so, what those matters are, at step 234. If the user has no other interest, IRS 126 returns the contact to manager 120 with a "no interest" indication, at step 236. This causes manager 120 to treat the contact conventionally, at steps 300-304 of FIG. 3. If the user does express another interest, IRS 126 interacts with the user to determine the user's level of interest therein, at step 238. IRS 126 may ask the user whether the user would be interested in the additional matter even after having their primary need served. Alternatively, communications manager 120 may simply record the fact that the customer expressed interest in an additional matter, and then later have the primary agent ask the caller if they would like to be requeued for the additional matter. IRS 126 then returns the contact to manager 120 with an "interested in X" indication, where X identifies the interest of the user, and a level of the user's interest in X, e.g., low interest or high interest, at step 238.

In response to step 238, manager 120 tags the contact, at step 310 of FIG. 3. When the contact advances to the head of a queue, presence of the tag will cause the contact to maintain its place at the head of the queue, and other contacts from that queue will be serviced instead. (This happens only in the situation where the contact is already being served by an agent from another queue and the agents cannot be, or do not want to be, conferenced together with the customer.) Based upon the interest of the user identified by IRS 126, manager 120 selects one or more secondary queues 122 that correspond to those interests, at step 312, and enqueues the contact in the secondary queue 122, at step 314. The contact thus becomes enqueued simultaneously in both the primary queue and the secondary queue. Because of the decisions made by IRS 126 at step 232 that were based on EWTs of queues 122, the contact may (is likely to) reach the head of the secondary queue 122 before it reaches the head of the primary queue 122. When the contact does reach the head of the secondary queue 122, at step 320, manager 120 checks whether the user is being served by an agent of the primary queue 122 (i.e., whether the user's contact is being served from the primary queue 122), at step 322. If so, manager 120 checks the level of the user's interest in the secondary matter that was reported at step 240, at step 324. If the level of interest is low, manager 120 proceeds to steps 430 et seq. of FIG. 4. If the interest is high, or if the interest was not assessed, manager 120 determines whether an available agent of the secondary queue 122 should be conferenced in with the contact and the agent of the primary queue 122 who is servicing the contact from the primary queue 122 so that both agents can service the contact simultaneously, at step 326. Illustratively, the determination can be made either on the basis of administered policy, or by a whisper message played to the agent of the secondary queue 122 and giving him/her the option of accepting the conference. If manager 120 determines that the agents from the primary and secondary queues should be conferenced, the serving agent informs the user that another agent will be joining the call, at step 328, and conferences both agents with the contact, at step 330. Manager 120 also untags the contact, at step 332. The agents now service the contact together. When they finish servicing the contact, at step 334, the contact is ended, at step 336. The agents may complete their servicing at different times, thus leaving only one agent to finish servicing the contact, in which case the contact is ended a step 336 when the last agent finishes servicing the contact.

Returning to step 322, if it is determined there that the contact is not being served out of the primary queue 122, manager 120 connects the contact to terminal 124 of the next available agent for the secondary queue 122, and the agent services the contact, at step 340. When the agent finishes servicing the contact, manager 120 checks whether the contact is still tagged, at step 342. If not, the contact is ended, at step 346; if so, manager 120 untags the contact, at step 344, and processing of the contact will continue at steps 300 et seq.

After being enqueued in the secondary queue 122 at step 314, when the contact reaches the head of the primary queue 122, at step 410 of FIG. 4, manager 120 checks whether the contact is currently being serviced by an agent of the secondary queue 122, at step 412. If so, manager 120 determines whether an available agent of the primary queue should be conferenced in with the contact and the agent of the secondary queue 122 who is servicing the contact so that both agents can service the contact simultaneously, at step 414. If so, manager 120 proceeds to steps 328 et seq. of FIG. 3; if not, the position of the contact at the head of the primary queue 122 is maintained while other contacts from the primary queue 122 are serviced instead, at step 416, and the contact is processed from the secondary queue 122, at steps 340 et seq. of FIG. 3

Returning to step 412, if it is determined there that the subject contact is not currently being serviced by an agent of the secondary queue 122, manager 120 checks the level of the user's interest in the secondary matter that was reported at step 240, at step 420. If the level of interest is high, the position of the contact at the head of the secondary queue 122 is maintained while other contacts from the secondary queue 122 are serviced instead, at step 422, and the contact is processed from the primary queue, at steps 424 et seq. At step 424, manager 120 connects the contact to the terminal 124 of the next available agent for the primary queue 122, and the agent services the contact, at step 424. When the agent finishes servicing the contact, manager 120 untags the contact, at step 426, and processing of the contact will continue at steps 320 et seq.

Returning to step 420, if it is there determined that the user's interest in the secondary service is low, manager 120 deletes the contact from the secondary queue, at step 430, untags the contact, at step 432, connects the contact to the terminal 124 of the next available agent for the primary queue 122, and the agent services the contact, at step 434. When the agent finishes servicing the contact, the contact is ended, at step 436.

Of course, various changes and modifications to the illustrative embodiment described above will be apparent to those skilled in the art. For example, the contact may be enqueued in more than one secondary contact queue, for a different matter in each, and may be serviced either out of all of the secondary queues, out of only those secondary queues that can be accommodated before the contact reaches the head of the primary queue, or only out of whichever secondary queue's head the contact reaches first. These changes and modifications can be made without departing from the spirit and the scope of the invention and without diminishing its attendant advantages. It is therefore intended that such changes and modifications be covered by the following claims except insofar as limited by the prior art.

What is claimed is:

1. A method comprising:
   enqueuing a contact in a first contact queue;
   determining whether or not to enqueue the contact in a second contact queue based on a determined level of interest of a contactor in a matter corresponding to the second contact queue;
   in response to the determining, enqueuing the contact in the second contact queue while the contact remains enqueued in the first contact queue;
   firstly servicing the contact with a first resource of one of the first and the second contact queue while the contact remains enqueued in the other of the first and the second contact queue; and
   subsequently to commencing of the firstly servicing, secondly servicing the contact with a second resource of the other of the first and the second contact queue.

2. The method of claim 1 wherein:
   firstly servicing comprises servicing the contact with a resource of the second contact queue while the contact remains enqueued in the first contact queue; and
   secondly servicing comprises subsequently to commencing of servicing the contact with the resource of the second contact queue, servicing the contact with a resource of the first contact queue.

3. The method of claim 2 wherein:
   secondly servicing comprises advancing the contact through the first contact queue to a head of the first contact queue, maintaining the contact in the first contact queue while the contact is being firstly serviced, and in response to completing the firstly servicing, removing the contact from the first contact queue and secondly servicing the contact.

4. The method of claim 2 wherein:
   secondly servicing comprises advancing the contact through the first contact queue to a head of the first contact queue, and in response to the contact reaching the head of the first contact queue, simultaneously firstly and secondly servicing the contact.

5. The method of claim 4 wherein:
simultaneously firstly and secondly servicing comprises conferencing the resource of the first contact queue and the resource of the second contact queue with a contactor.

6. The method of claim 1 wherein:
firstly servicing comprises servicing the contact with the resource of the first contact queue while the contact remains enqueued in the second contact queue; and
secondly servicing comprises in response to determining a high said level of interest, servicing the contact with the resource of the second contact queue subsequently to commencing of the firstly servicing.

7. The method of claim 6 wherein:
secondly servicing comprises advancing the contact through the second contact queue to a head of the second contact queue, maintaining the contact in the second contact queue while the contact is being firstly serviced, and in response to completing the firstly servicing, removing the contact from the second contact queue and secondly servicing the contact.

8. The method of claim 6 wherein:
secondly servicing comprises advancing the contact through the second contact queue to a head of the second contact queue, and in response to the contact reaching the head of the second contact queue, simultaneously firstly and secondly servicing the contact.

9. The method of claim 8 wherein:
simultaneously firstly and secondly servicing comprises conferencing the resource of the first contact queue and the resource of the second contact queue with a contactor.

10. The method of claim 1 wherein:
determining comprises while the contact is enqueued in the first contact queue, interacting with a contactor to determine whether or not to enqueue the contact in the second contact queue.

11. The method of claim 1 wherein:
determining comprises determining an in queue estimated wait time (EWT) for each of the first contact queue and a plurality of the second contact queues, while the contact is enqueued in the first contact queue, interacting with a contactor, and using the EWTs and results of the interacting to determine whether or not to enqueue the contact in at least one of the second contact queues.

12. The method of claim 1 further comprising:
enqueuing a second contact in the first contact queue;
determining whether or not to enqueue the second contact in the second contact queue;
in response to the determining, enqueuing the second contact in the second contact queue while the second contact remains enqueued in the first contact queue;
servicing the second contact with a resource of the first contact queue;
removing the second contact from the second contact queue; and
not servicing the second contact with a resource of the second contact queue.

13. The method of claim 1 further comprising:
enqueuing a second contact in the first contact queue;
determining whether or not to enqueue the second contact in the second contact queue;
determining a level of interest of a contactor corresponding to the second contact in a matter corresponding to the second contact queue;
in response to determining to enqueue the second contact in the second contact queue, enqueuing the second contact in the second contact queue while the second contact remains enqueued in the first contact queue;
servicing the second contact with a resource of the first contact queue; and
servicing or not servicing the second contact with a resource of the second contact queue depending upon the determined level of interest of the contactor corresponding to the second contact in the matter corresponding to the second contact queue.

14. The method of claim 1 further comprising:
enqueuing a second contact in the first contact queue;
determining whether or not to enqueue the second contact in the second contact queue;
in response to determining to enqueue the second contact in the second contact queue, enqueuing the second contact in the second contact queue; and
in response to determining to not enqueue the second contact in the second contact queue, forbearing from enqueuing the second contact in the second contact queue.

15. The method of claim 1 wherein:
the resource of the first contact queue serves a first need or interest of the contact; and
the resource of the second contact queue serves a second need or interest of the contact that is different from the first need or interest.

16. A non-transitory computer-readable medium containing instructions which, when executed by a computer, cause the computer to perform the method of one of claims 1-15.

17. An apparatus comprising:
a storage medium defining a first contact queue and a second contact queue;
at least one first resource associated with the first contact queue;
at least one second resource associated with the second contact queue;
a system for determining whether or not to enqueue the contact in the second contact queue based on a determined level of interest of a contactor in a matter corresponding to the second contact queue; and
a manager for enqueuing the contact in the first contact queue, for enqueuing the contact in the second contact queue while the contact remains enqueued in the first contact queue in response to the determining, for causing one of the first and the second resource to firstly service the contact while the contact remains enqueued in the other of the first and the second contact queue, and for causing the other of the first and the second resource to secondly service the contact subsequently to commencing the firstly servicing.

18. The apparatus of claim 17 wherein:
the manager is adapted to cause the second resource to firstly service the contact with the second resource while the contact remains enqueued in the first contact queue, and is adapted to cause the first resource to secondly service the contact with the first resource subsequently to commencing the firstly servicing.

19. The apparatus of claim 18 wherein:
the manager is further adapted for advancing the contact through the first contact queue to a head of the first contact queue, for maintaining the contact in the first contact queue while the contact is being firstly serviced, and for removing the contact from the first contact queue and causing the contact to be secondly serviced in response to completion of the first servicing.

20. The apparatus of claim 18 wherein:
the manager is further adapted for advancing the contact through the first contact queue to a head of the first contact queue, and then for causing the contact to be simultaneously firstly and secondly serviced.

21. The apparatus of claim 20 wherein:
the manager is adapted to conference the first and the second resource with a contactor to cause the contact to be simultaneously firstly and secondly serviced.

22. The apparatus of claim 17 wherein:
the manager is adapted to cause the first resource to firstly service the contact while the contact remains enqueued in the second contact queue, and is adapted to cause the second resource to secondly service the contact subsequently to commencing of the firstly servicing in response to determining a high said level of interest.

23. The apparatus of claim 22 wherein:
the manager is further adapted for advancing the contact through the first contact queue to a head of the first contact queue, for maintaining the contact in the first contact queue while the contact is being firstly serviced, and for removing the contact from the first contact queue and causing the contact to be secondly serviced in response to completion of the firstly servicing.

24. The apparatus of claim 22 wherein:
the manager is further adapted for advancing the contact through the second contact queue to a head of the second contact queue, and then for causing the contact to be simultaneously firstly and secondly serviced.

25. The apparatus of claim 24 wherein:
the manager is adapted to conference the first and the second resource with a contactor to cause the contact to be simultaneously firstly and secondly serviced.

26. The apparatus of claim 17 wherein:
the system comprises an interactive response system for interacting with an originator of the contact while the contact is enqueued in the first contact queue, to determine whether or not to enqueue the contact in the second contact queue.

27. The apparatus of claim 26 wherein:
the manager is further adapted for determining an in queue estimated wait time (EWT) for each of the first contact queue and for a plurality of the second contact queues, and is adapted to use the EWTs and results of the interacting to determine whether or not to enqueue the contact in at least one of the second contact queues.

28. The apparatus of claim 17 wherein:
the system is further adapted for determining whether or not to enqueue a second contact in the second contact queue; and
the manager is further adapted for enqueuing the second contact in the first contact queue, in response to the determining for enqueuing the second contact in the second contact queue while the contact remains enqueued in the first contact queue, for causing a first resource to service the second contact, for removing the second contact from the second contact queue, and for forbearing from causing a second resource to service the second contact.

29. The apparatus of claim 17 wherein:
the manager or the system is adapted to determine whether or not to enqueue a second contact in the second contact queue and a level of interest of a contactor corresponding to the second contact in a matter corresponding to the second contact queue; and
the manager is adapted to enqueue the second contact in the first contact queue, to enqueue the second contact in the second contact queue in response to determining to enqueue the second contact in the second contact queue, to cause the second contact to be serviced by a first resource, and to cause or not cause the second contact to be serviced by a second resource depending upon the determined level of interest of the contactor corresponding to the second contact in the matter corresponding to the second contact queue.

30. The apparatus of claim 17 wherein:
the manager or the system is adapted to determine whether or not to enqueue a second contact in the second contact queue; and
the manager is adapted to enqueue the second contact in the first contact queue, to enqueue the second contact in the second contact queue in response to a determination to enqueue the second contact in the second contact queue, and to forbear from enqueuing the second contact in the second contact queue in response to a determination to not enqueue the second contact in the second contact queue.

31. The apparatus of claim 17 wherein:
the at least one first resource is for serving a first need or interest of the contact, and the at least one second resource is for serving a second need or interest of the contact that is different from the first need or interest.

* * * * *